(12) United States Patent
Mercier et al.

(10) Patent No.: US 11,110,745 B2
(45) Date of Patent: Sep. 7, 2021

(54) WHEEL FOR A VEHICLE

(71) Applicant: BOMBARDIER RECREATIONAL PRODUCTS INC., Valcourt (CA)

(72) Inventors: Daniel Mercier, Magog (CA); Francois Giroux, Valcourt (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 461 days.

(21) Appl. No.: 16/033,735

(22) Filed: Jul. 12, 2018

(65) Prior Publication Data

US 2019/0016177 A1 Jan. 17, 2019

Related U.S. Application Data

(60) Provisional application No. 62/532,549, filed on Jul. 14, 2017.

(51) Int. Cl.
| | |
|---|---|
| *B60B 30/08* | (2006.01) |
| *B60K 7/00* | (2006.01) |
| *B62D 61/06* | (2006.01) |
| *B62K 25/28* | (2006.01) |
| *B60B 27/00* | (2006.01) |
| *B60B 27/04* | (2006.01) |
| *B60B 21/02* | (2006.01) |
| *B62K 5/027* | (2013.01) |
| *B60B 1/00* | (2006.01) |
| *B60B 7/00* | (2006.01) |
| *B62K 5/05* | (2013.01) |
| *B62M 9/16* | (2006.01) |
| *B62K 5/08* | (2006.01) |
| *B60B 1/06* | (2006.01) |

(52) U.S. Cl.
CPC .......... *B60B 30/08* (2013.01); *B60B 27/0021* (2013.01); *B60B 27/04* (2013.01); *B60K 7/0007* (2013.01); *B62D 61/065* (2013.01); *B62K 25/283* (2013.01); *B60B 1/003* (2013.01); *B60B 1/06* (2013.01); *B60B 7/0006* (2013.01); *B60B 21/026* (2013.01); *B60K 2007/0046* (2013.01); *B60K 2007/0061* (2013.01); *B60Y 2200/122* (2013.01); *B60Y 2200/13* (2013.01); *B62K 5/027* (2013.01); *B62K 5/05* (2013.01); *B62K 5/08* (2013.01); *B62K 2204/00* (2013.01); *B62M 9/16* (2013.01)

(58) Field of Classification Search
CPC ......... B60B 30/08; B60K 25/08; B60T 1/065; F16D 2065/1384; F16D 65/12; F16H 55/36; F16H 55/40; B62D 61/065
See application file for complete search history.

(56) References Cited

U.S. PATENT DOCUMENTS

| | | | | |
|---|---|---|---|---|
| 370,714 | A * | 9/1887 | Slentz | B60B 3/08 |
| | | | | 301/6.5 |
| 558,519 | A * | 4/1896 | Pridmore | B60B 3/16 |
| | | | | 301/6.1 |
| 1,378,563 | A * | 5/1921 | Schofield | B62D 59/02 |
| | | | | 301/6.5 |

(Continued)

*Primary Examiner* — Jason R Bellinger
(74) *Attorney, Agent, or Firm* — BCF LLP

(57) ABSTRACT

A wheel for a vehicle is provided. The wheel has a rim configured for mounting a tire thereto. The wheel also has a rotary drive member that is integrally connected to the rim. The drive member is configured to be operatively connected to a motor of the vehicle.

21 Claims, 9 Drawing Sheets

(56) References Cited

U.S. PATENT DOCUMENTS

| | | | | |
|---|---|---|---|---|
| 2,186,996 | A * | 1/1940 | Short | B60B 25/20 |
| | | | | 301/6.5 |
| 2,232,584 | A * | 2/1941 | Aitken | B62D 11/10 |
| | | | | 192/25 |
| 2,383,121 | A * | 8/1945 | Flink | B60K 25/08 |
| | | | | 301/6.5 |
| 2,432,621 | A * | 12/1947 | Grobowski | A01D 34/62 |
| | | | | 301/112 |
| 5,328,252 | A * | 7/1994 | Thompson | B60B 23/10 |
| | | | | 301/105.1 |
| 5,992,587 | A * | 11/1999 | Maldonado | B60T 1/065 |
| | | | | 180/219 |
| 7,121,570 | B2 * | 10/2006 | Parker | B62K 25/283 |
| | | | | 280/285 |
| 8,439,453 | B2 * | 5/2013 | Baird | B62K 25/283 |
| | | | | 301/6.8 |
| 8,690,264 | B2 * | 4/2014 | Mikura | B60B 1/08 |
| | | | | 301/6.9 |
| 2004/0183358 | A1 * | 9/2004 | Chuang | F16H 55/171 |
| | | | | 301/6.5 |
| 2006/0091719 | A1 * | 5/2006 | Cowling | F16D 65/123 |
| | | | | 301/6.1 |
| 2015/0069817 | A1 * | 3/2015 | Urano | B60T 1/065 |
| | | | | 301/6.8 |
| 2015/0273937 | A1 * | 10/2015 | Johnson | B60B 19/00 |
| | | | | 301/6.1 |

* cited by examiner

WHEEL FOR A VEHICLE

CROSS-REFERENCE

The present application claims priority to U.S. Provisional Patent Application No. 62/532,549, filed on Jul. 14, 2017, the entirety of which is incorporated herein by reference.

FIELD OF TECHNOLOGY

The present technology relates to a wheel for a vehicle.

BACKGROUND

Three-wheeled straddle-seat vehicles have been developed for road use with a desire to combine the riding qualities experienced in four wheeled automobiles and two wheeled motorcycles.

The driving wheel or wheels of these vehicles need to be connected to the motor, which can require complex mechanisms. Also, in order to drive a wheel, additional components, such as a sprocket, need to be fastened to the wheel. These render the assembly of the vehicle more complex, time consuming and more costly. These also make the mounting of a driving wheel to the vehicle more complex, time consuming and more costly.

There is therefore a desire for a simplified mechanism for connecting a driving wheel to a motor of the vehicle.

SUMMARY

It is an object of the present technology to ameliorate at least some of the inconveniences described above.

According to various aspects of the present technology, there is provided a wheel for a vehicle. The wheel has a rotary drive member that is integrally connected to a rim of the wheel. By having the rotary drive member integrally formed with the rim, the connection of the wheel to the motor is simplified and less time consuming, thereby also making the assembly of the vehicle simplified and less time consuming. Also, by having the rotary drive member integrally connected to the rim, the rotary drive member can have a large diameter, which can provide a high reduction ratio which is desirable when the wheel is driven by an electric motor.

According to an aspect of the present technology, there is provided a wheel for a vehicle. The wheel has a rim configured for mounting a tire. The wheel also has a rotary drive member integrally connected to the rim and configured to be operatively connected to a motor of the vehicle.

In some implementations, the rotary drive member is axially offset from the rim.

In some implementations, the rim has a sleeve, and the rotary drive member has an outer diameter that is greater than an inner diameter of the sleeve.

In some implementations, the outer diameter of the rotary drive member is greater than the inner diameter of the sleeve measured at a lateral edge of the sleeve. The lateral edge of the sleeve is axially between an axial center of the wheel and the rotary drive member.

In some implementations, the rotary drive member has an outer diameter and the wheel has a maximum diameter defined by the rim. The ratio of the outer diameter of the rotary drive member over the maximum diameter of the wheel is at least 0.7.

In some implementations, the ratio of the outer diameter of the rotary drive member over the maximum diameter of the wheel is at least 0.9.

In some implementations, the rotary drive member is a pulley.

In some implementations, the wheel has a plurality of branches integrally connecting the rotary drive member to the rim. The plurality of branches are circumferentially spaced apart from one another.

In some implementations, the wheel has a hub, a sleeve and a plurality of spokes connecting the hub to the sleeve.

In some implementations, the rim and the rotary drive member are concentric.

In some implementations, the rim has a sleeve and the rotary drive member is integrally connected to the sleeve.

In some implementations, a wheel assembly includes the wheel and a tire mounted to the rim of the wheel.

In some implementations, a vehicle has a frame, a suspension assembly operatively connected to the frame, a motor supported by the frame and the wheel assembly rotatably connected to the suspension assembly. The rotary drive member is operatively connected to the motor.

In some implementations, the suspension assembly has a swing arm having a proximal end and a distal end. The proximal end of the swing arm is pivotally connected to the frame about a swing arm pivot axis. The suspension assembly also has a shock absorber connected between the swing arm and the frame. The wheel is rotatable connected to the distal end of the swing arm.

In some implementations, the motor is mounted to the swing arm and is pivotable about the swing arm pivot axis.

In some implementations, the swing arm extends at least in part inside the rotary drive member.

In some implementations, the motor is an electric motor.

In some implementations, the motor has an output shaft and the vehicle has a transmission assembly operatively connecting the output shaft to the rotary drive member of the wheel. The transmission assembly has a driving member connected to the output shaft of the motor and a flexible drive element interconnecting the driving member of the motor to the rotary drive member of the wheel.

In some implementations, the rotary drive member of the wheel has an outer diameter and the driving member of the transmission assembly has an outer diameter. A ratio of the outer diameter of the rotary drive member of the wheel over the outer diameter of the driving member of the transmission assembly is at least 8.

In some implementations, the suspension assembly is a rear suspension assembly.

For the purposes of the present application, terms related to spatial orientation such as forward, rearward, front, rear, upper, lower, left, and right, are as they would normally be understood by a driver of the vehicle sitting therein in a normal driving position with the vehicle being upright and steered in a straight ahead direction.

Explanations and/or definitions of terms provided in the present application take precedence over explanations and/or definitions of these terms that may be found in the document incorporated herein by reference.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should also be noted that, unless otherwise explicitly specified herein, the drawings are not necessarily to scale.

DETAILED DESCRIPTION

The present technology will be described herein with respect to a three-wheeled straddle-type vehicle 10. It is contemplated that at least some aspects of the present technology could also be implemented with vehicles having two, four, or more wheels.

Figure 1:
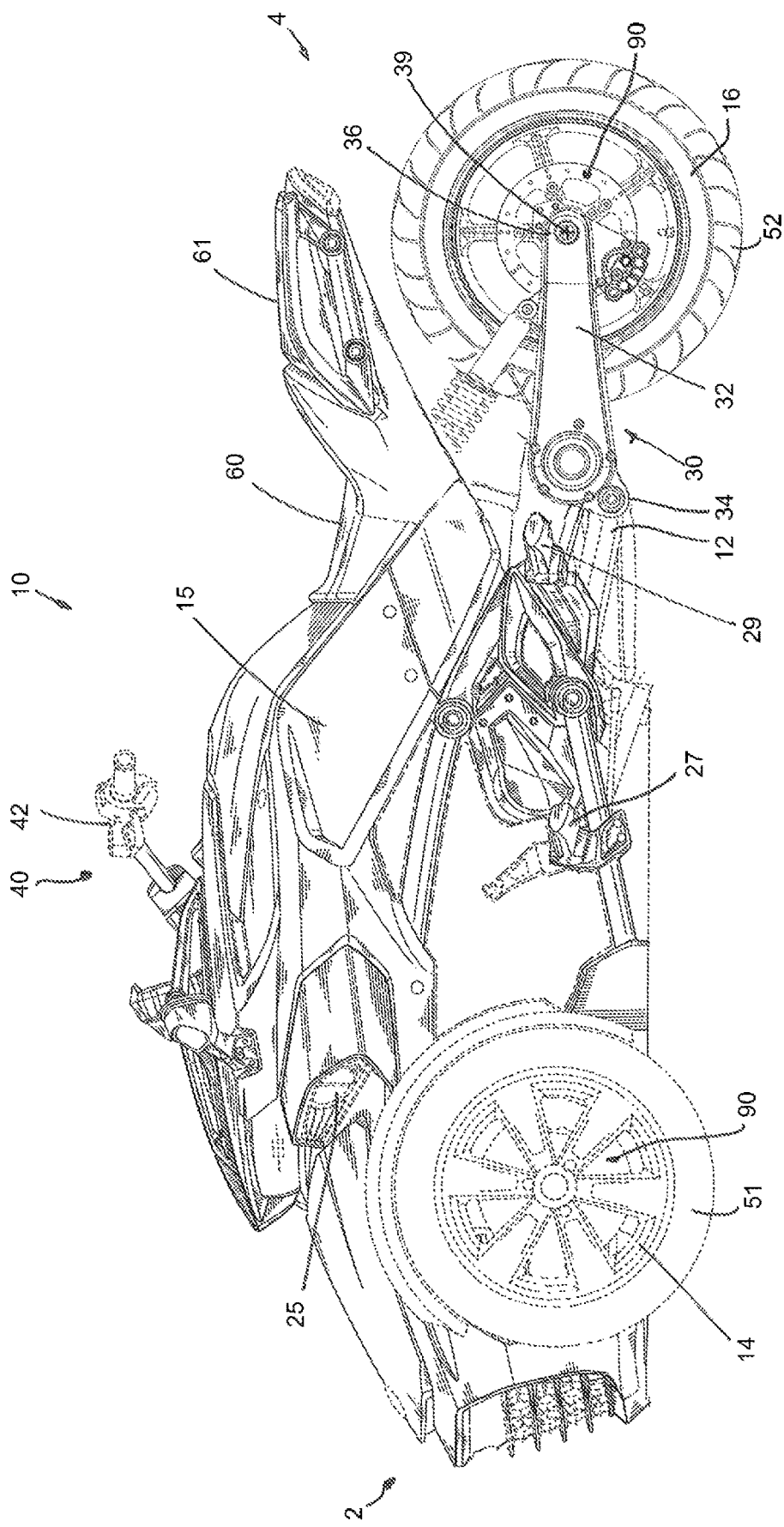
FIG. 1 is a left side elevation view of a vehicle according to the present technology.
Figure 2:
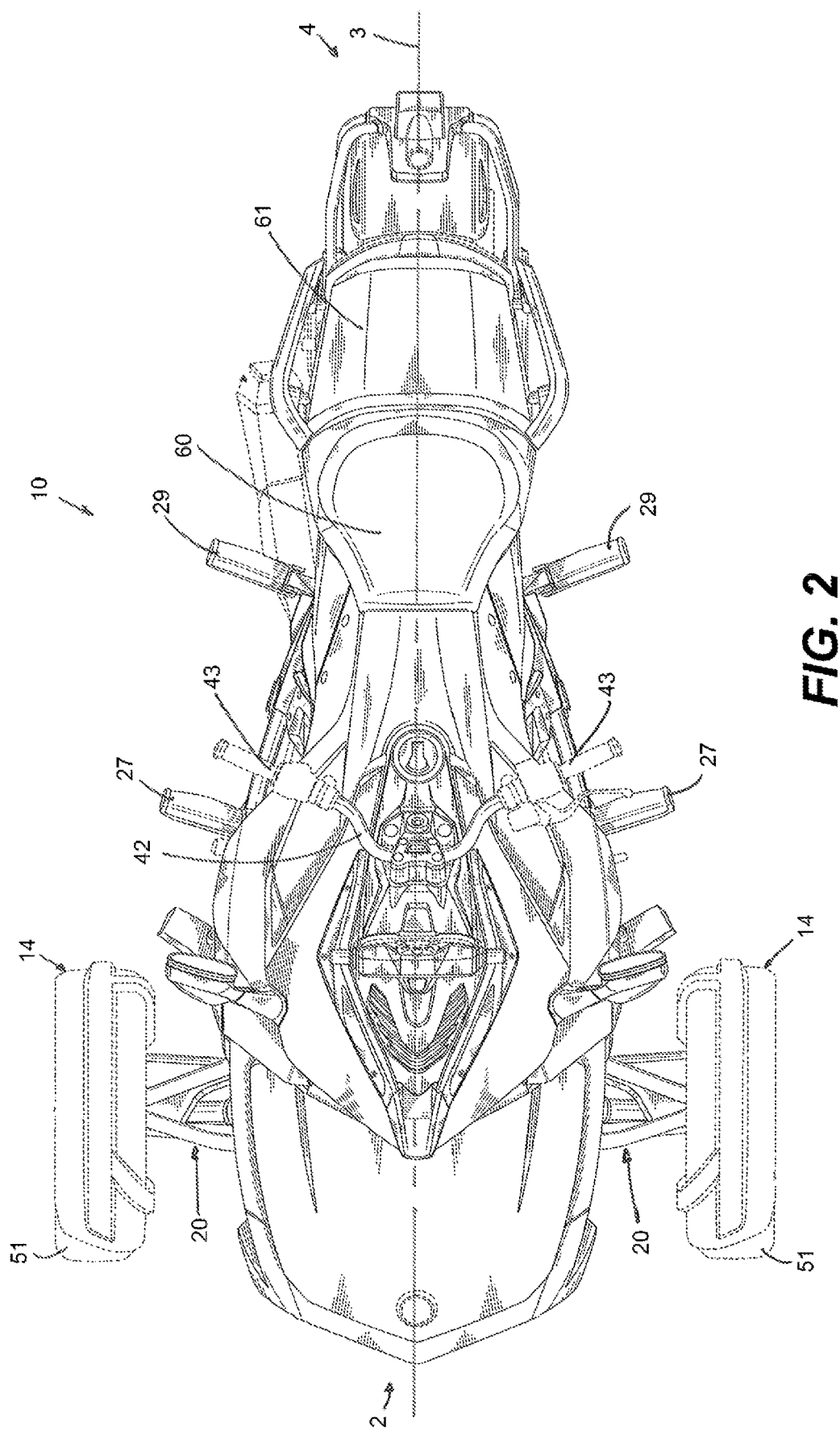
FIG. 2 is a top plan view of the vehicle of FIG. 1.

With reference to FIGS. 1 and 2, a vehicle 10 has a front end 2, a rear end 4, and a longitudinal centerplane 3 defined consistently with the forward travel direction of the vehicle 10. The vehicle 10 has a frame 12 on which various components of the vehicle 10 are supported.

The vehicle 10 is a three-wheeled vehicle including a left front wheel 14 mounted to the frame 12 by a left front suspension assembly 20 and a right front wheel 14 mounted to the frame 12 by a right front suspension assembly 20. The vehicle 10 also comprises a single rear wheel 16 supported by a rear suspension assembly 30 of the vehicle 10. The left and right front wheels 14 and the rear wheel 16 each have a tire 51 or 52 secured thereto. Each tire 51 or 52 with its corresponding wheel 14 or 16 together form a wheel assembly. The front wheels 14 are disposed equidistant from the longitudinal centerplane 3 of the vehicle 10 (shown in FIG. 2), and the rear wheel 16 is centered with respect to the longitudinal centerplane 3. It is contemplated that aspects of the present technology could also be implemented on a vehicle with two rear wheels 16 and a single, centered front wheel 14.

In the illustrated implementation, each front suspension assembly 20 is a double A-arm type suspension, also known as a double wishbone suspension. Notably, each front suspension assembly 20 includes an upper A-arm, a lower A-arm and a shock absorber. It is contemplated that other types of suspensions, such as a McPherson strut suspension, or a swing arm suspension could be used.

As shown in FIGS. 3 to 6, the rear suspension assembly 30 comprises a swing arm 32 that is pivotally connected at a proximal end 34 thereof to the frame 12 about a swing arm pivot axis 35 extending laterally. In this implementation, the swing arm pivot axis 35 is defined by two pivots 55. The left pivot 55 extends through apertures defined in a front portion 57 of the swing arm 32 and in the frame 12. The right pivot 55 will be described further below.

The rear suspension assembly 30 also comprises a shock absorber 37 for providing shock absorption to the rear suspension assembly 30. The shock absorber 37 comprises a spring 41 and a damper 45. The shock absorber 37 is pivotally connected between the frame 12 and the swing arm 32. Specifically, an end 47 of the shock absorber 37 is pivotally connected to the swing arm 32 and an opposite end 49 of the shock absorber 37 is pivotally connected to the frame 12.

The rear wheel 16 is rotatably mounted to a distal end 36 of the swing arm 32 which extends on a left side of the rear wheel 16. More specifically, the rear wheel 16 is rotatable about a wheel rotation axis 39 extending laterally.

The vehicle 10 has a straddle seat 60 mounted to the frame 12 and disposed along the longitudinal centerplane 3. The straddle seat 60 is intended to accommodate a single adult-sized rider, i.e., the driver. In the illustrated implementation, a passenger seat 61 is also provided behind the straddle seat 60 in order to accommodate a passenger behind the driver.

A driver footrest 27 is disposed on either side of the vehicle 10 and vertically lower than the straddle seat 60 to support the driver's feet (see FIG. 1). The driver footrests 27 are connected to the frame 12. In the implementation of the vehicle 10 illustrated herein, the driver footrests 27 are in the form of foot pegs disposed longitudinally forward of the straddle seat 60. It is also contemplated that the footrests 27 could be in the form of footboards. In this implementation, the vehicle 10 is also provided with passenger footrests 29 disposed rearward of the driver footrest 27 on each side of the vehicle 10, for supporting a passenger's feet. It is contemplated that a brake pedal could be connected to the right driver footrest for braking the vehicle 10.

The vehicle 10 includes a steering assembly 40. A handlebar 42, which is part of the steering assembly 40, is disposed in front of the seat 60. The handlebar 42 is used by the driver to turn the front wheels 14 to steer the vehicle 10. A left hand grip 43 is placed around the left side of the handlebar 42 near the left end thereof and a right hand grip 43 is placed around the right side of the handlebar 42 near the right end to facilitate gripping for turning the handlebar 42 and thereby steering the vehicle 10. The right hand grip 43 provides twist-grip type throttle control. In this implementation, the left hand grip 43 includes a brake lever for braking the vehicle 10.

A central portion of the handlebar 42 is connected to an upper end of a steering column (not shown). From the handlebar 42, the steering column extends downwardly and leftwardly. The steering column is rotatably supported by the frame 12. A bottom portion of the steering column is operatively connected to the front wheels 14 for steering the vehicle 10. In implementations of a vehicle having a single front wheel, the steering column could be differently implemented, for example in the form of a triple clamp.

As can be seen in FIGS. 3 to 6, the vehicle 10 includes a power pack 150, including a motor 152 and a transmission assembly 154 operatively connecting the motor 152 to the rear wheel 16. While in the illustrated implementation, the power pack 150 is seen to include a single motor that is only connected to the rear wheel 16, in alternative implementations, the power pack 150 may include one or more additional motors connected to the front wheels 14 in order to drive the front wheels 14. It is contemplated that the motor 152 could be connected to the front wheels 14 instead of, or in addition to, the rear wheel 16.

Figure 3:
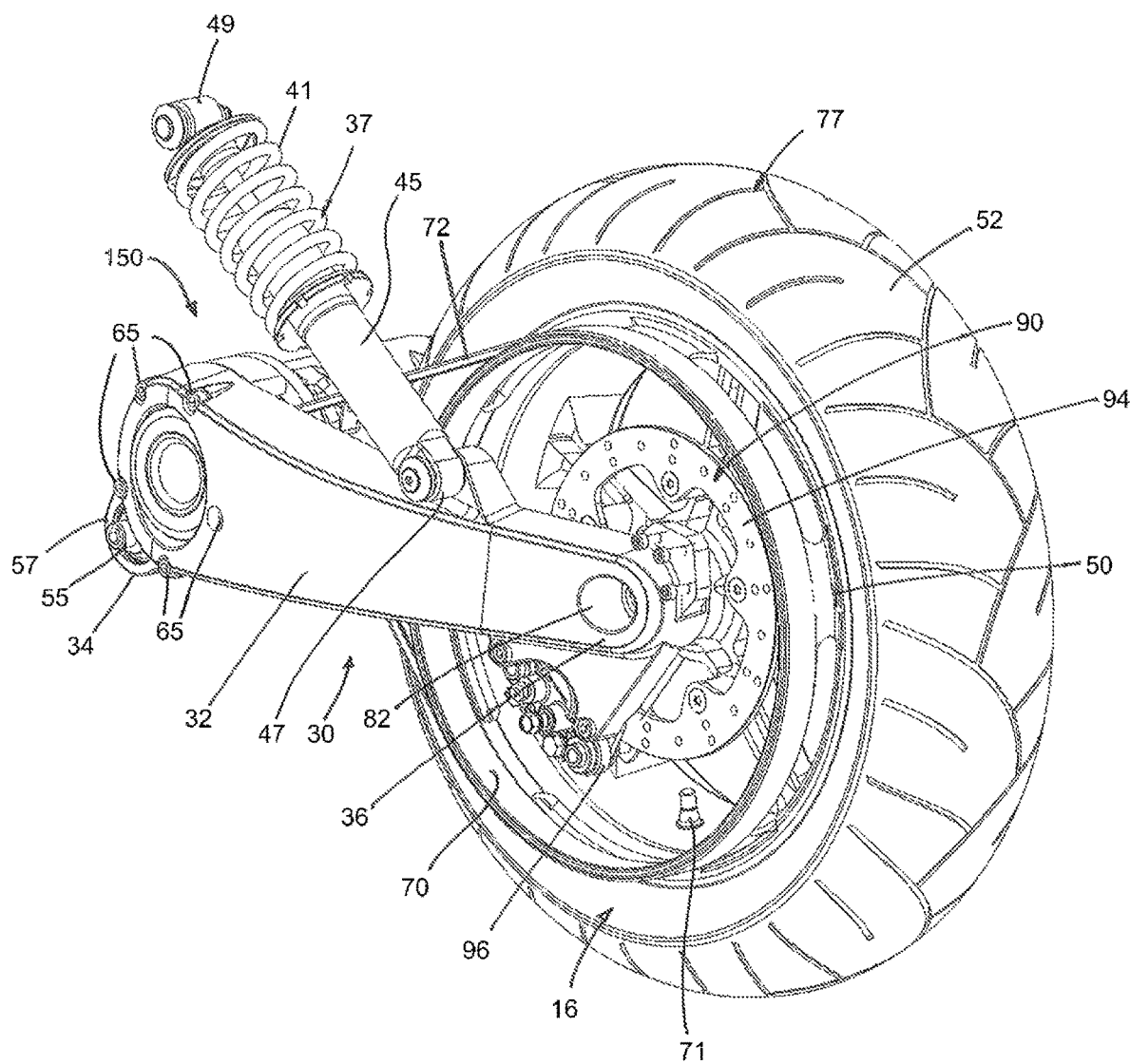
FIG. 3 is a rear, left side perspective view of a motor, a rear suspension assembly and a rear wheel assembly of the vehicle of FIG. 1.
Figure 4:
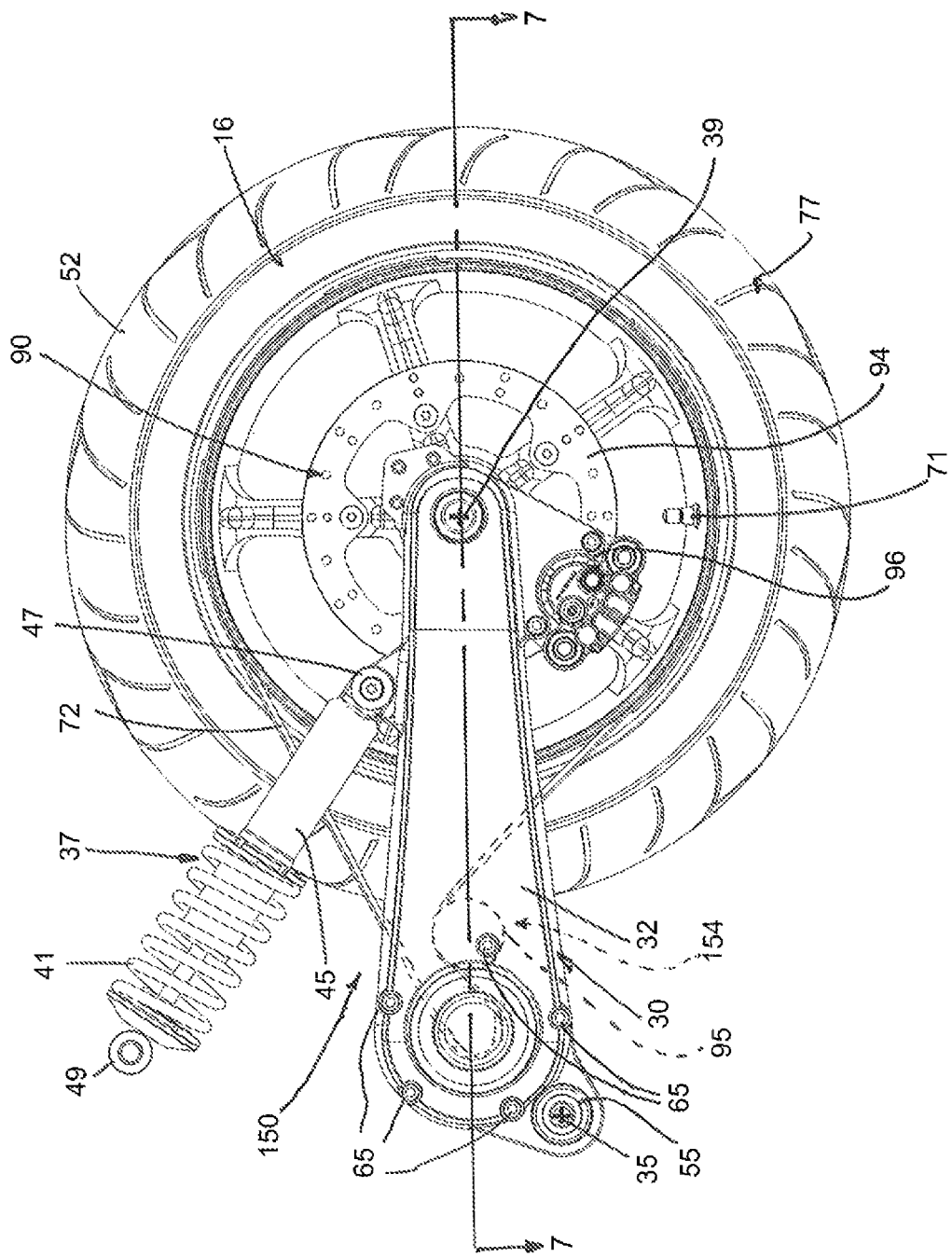
FIG. 4 is a left side view of the components of FIG. 3.
Figure 5:
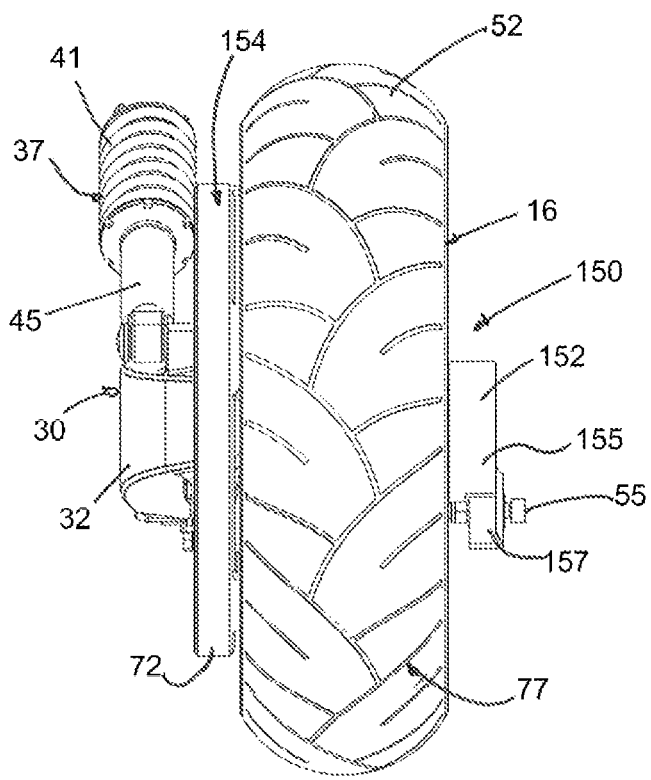
FIG. 5 is a rear elevation view of the components of FIG. 3.
Figure 6:
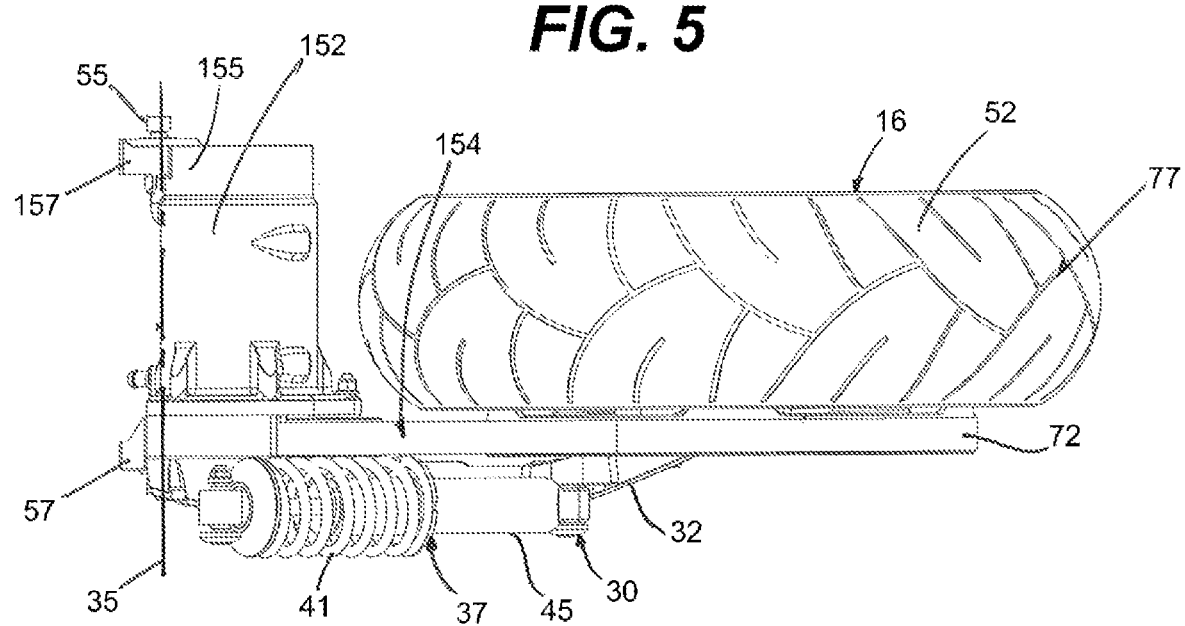
FIG. 6 is a top plan view of the components of FIG. 3.

The motor 152 is supported by the swing arm 32 of the rear suspension assembly 30 such that the motor 152 is pivotable about the swing arm pivot axis 35 along with the swing arm 32. More specifically, as shown in FIGS. 3 and 4, the motor 152 is fastened to the swing arm 32 by fasteners 65 which engage fastener receiving members (e.g., threaded openings) of a motor casing 155 (FIG. 6) of the motor 152. The right pivot 55 extends through apertures defined in a portion 157 of the motor casing 155 and in the frame 12. In the illustrated implementation of the vehicle 10, the motor 152 is an electric motor. It is however contemplated that the motor 152 could be other than an electric motor, for example an internal combustion engine, a hybrid or the like. In this implementation, the power pack 150 thus includes a battery (not shown) for powering the motor 152.

Since the motor 152 is an electric motor in this implementation, the vehicle 10 is not equipped with a fuel tank. Nevertheless, it is contemplated that in alternative implementations in which the motor 152 is an internal combustion engine, the vehicle 10 would comprise a fuel tank for supplying fuel to the engine. Furthermore, in such implementations in which the motor 152 is an internal combustion engine, the vehicle 10 would include an exhaust system fluidly connected to the motor 152, which includes a muffler.

Turning back to FIGS. 1 and 2, the vehicle 10 includes body panels 15 which are connected to and supported by the frame 12. The body panels 15 enclose and protect the internal components of the vehicle 10. The body panels 15 include a hood disposed at the front of the vehicle 10 between the front wheels 14. The vehicle 10 also includes headlights 25 connected to and supported by the frame 12.

With reference to FIGS. 1 and 3, each of the two front wheels 14 and the rear wheel 16 is provided with a brake assembly 90. Each brake assembly 90 is a disc-type brake mounted onto a wheel hub of the respective wheel 14 or 16. Other types of brakes are contemplated. As shown in FIG. 3 for the rear wheel 16, the brake assembly 90 includes a rotor 94 fastened to spokes 64 of the wheel 16 and a stationary caliper 96 straddling the rotor 94. The brake pads (not shown) are mounted to the caliper 96 so as to be disposed between the rotor 94 and the caliper 96 on either side of the rotor 94. The brake assemblies 90 of the two front wheels 14 are similar to the brake assembly 90 of the rear wheel 16. The brake lever of the left hand grip 43 is operatively connected to the brake assemblies 90 provided on each of the two front wheels 14 and the rear wheel 16.

The configuration of rear wheel assembly including the rear wheel 16 will now be described in more detail with reference to FIGS. 8 to 11.

The rear wheel 16 comprises a rim 50 configured to mount the tire 52. The rim 50 comprises a sleeve 53 defining the structure onto which the tire 52 is mounted. In particular, the sleeve 53 comprises a pair of flanges 54 defining a width of the rim 50 therebetween, a pair of bead seats 56 adjacent to the flanges 54, and a depression 58 disposed laterally between the bead seats 56. The flanges 54 prevent the tire 52 from slipping off the rim 50 and define a maximum diameter $D_{MAX}$ of the wheel 16 (shown in FIG. 11). The bead seats 56 are configured to seat edges of the tire 52 and determine a nominal diameter $D_R$ of the rim 50 measured from radially opposite points of the bead seats 56. The depression 58 (sometimes called a "drop center") is configured to facilitate mounting of the tire 52 onto the rim 50. The sleeve 53 of the rim 50 also has a valve opening 81 configured for receiving a valve 71 of the tire 52 therein (see FIGS. 3 and 4).

In this implementation, the tire 52 is a pneumatic tire configured for being filled with air. The tire 52 comprises a tread pattern 77. It is contemplated that the tire 52 could be any other suitable type of tire in alternative implementations (e.g., a non-pneumatic tire). The structure of the rim 50 may thus be different in other implementations to accommodate the specific type of tire used.

The rear wheel 16 also comprises a hub 62 and the spokes 64 extending from the hub 62 to the sleeve 53. The hub 62 is disposed radially inwardly of the sleeve 53 and is configured for connecting the rear wheel 16 to the swing arm 32. To that end, the hub 62 has a center bore 66 for receiving a shaft 68 (see FIG. 7) that connects the rear wheel 16 to the swing arm 32. The hub 62 is mounted to the shaft 68 via a bearing 80 such that the hub 62, and the rear wheel 16, is rotatable about the wheel rotation axis 39 defined by the shaft 68. For its part, the swing arm 32 securely receives the shaft 68 in its bore 82. In this example, the shaft 68 is a generally cylindrical sleeve having a lip 84 for engaging a counterbored portion of the bore 82 of the swing arm 32.

Figure 8:
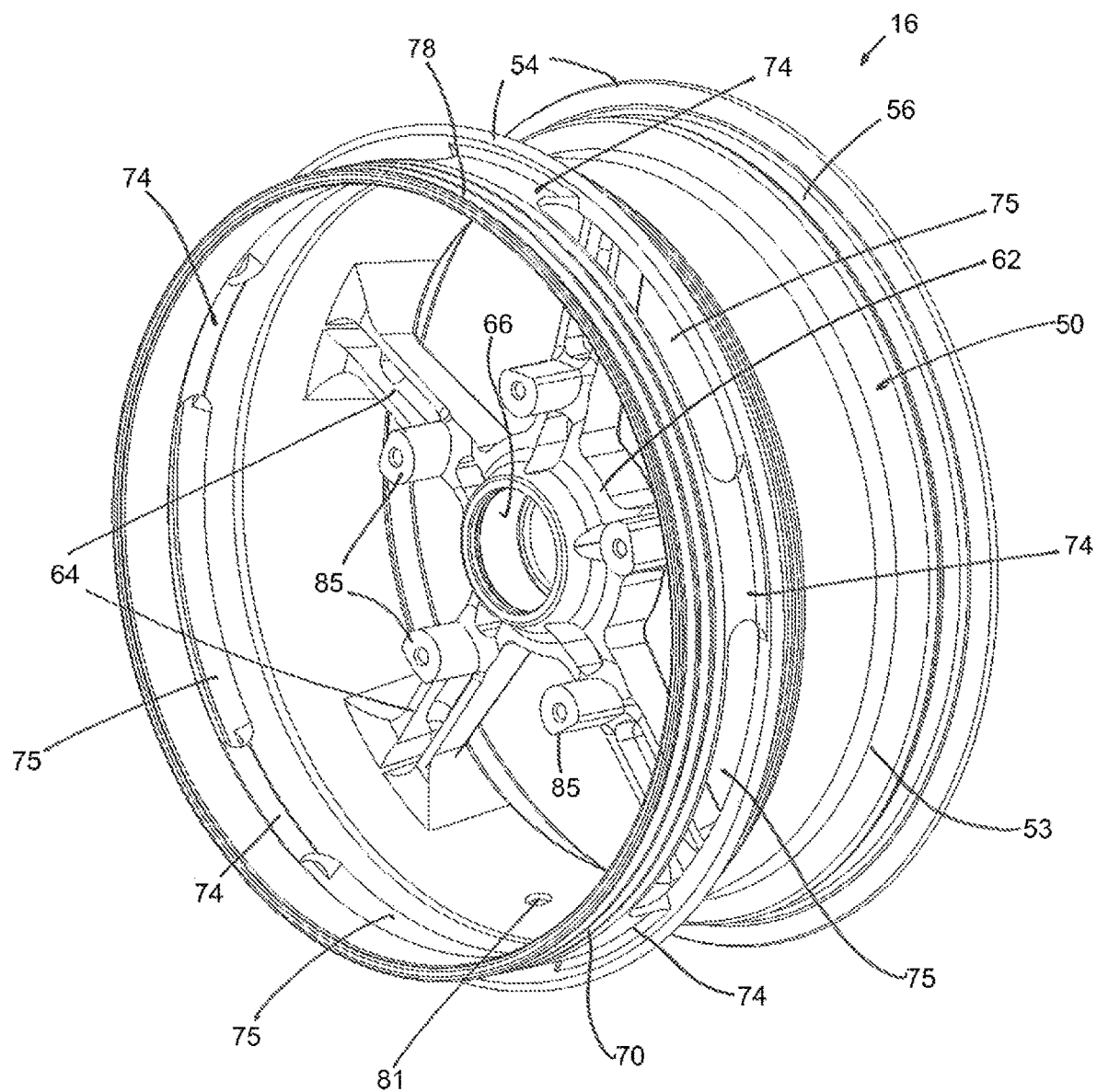
FIG. 8 is a rear, left side perspective view of a wheel of the rear wheel assembly of the vehicle of FIG. 1.
Figure 9:
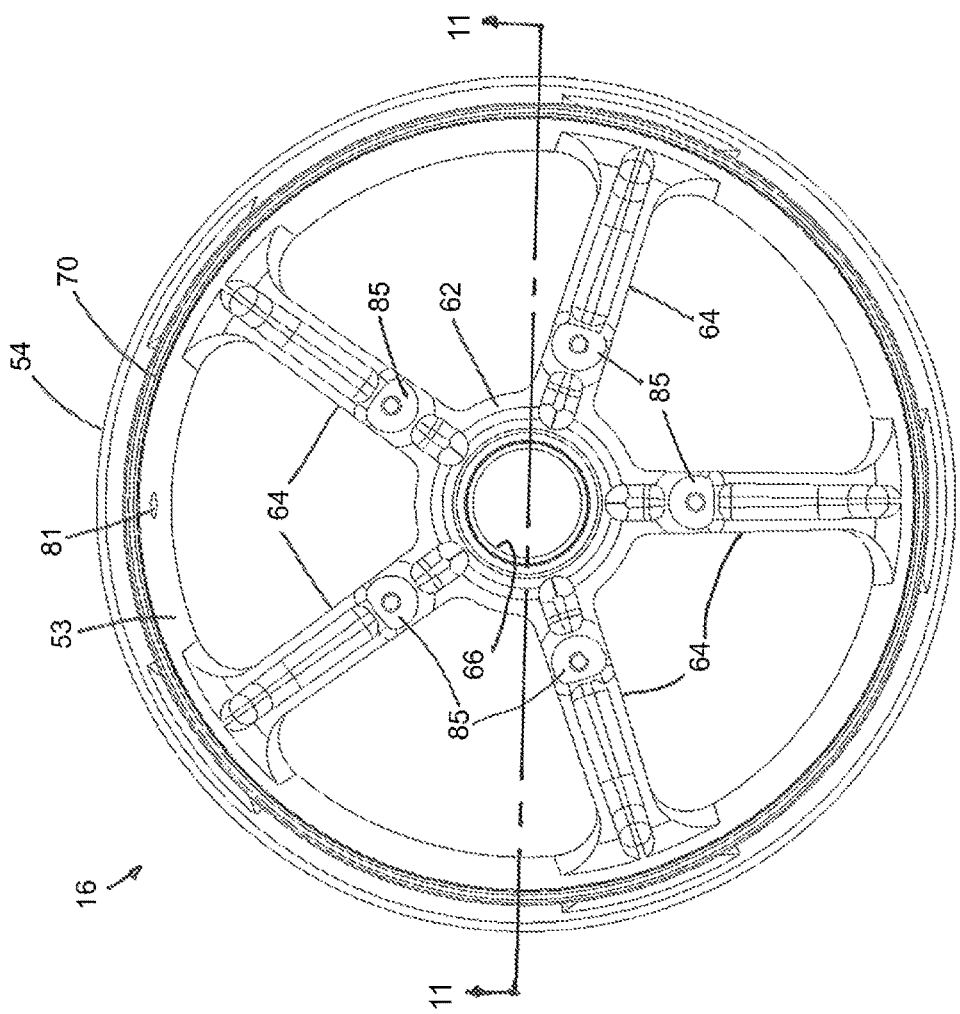
FIG. 9 is a left side view of the rear wheel of FIG. 8.

In this implementation, as shown in FIGS. 8 and 9, the spokes 64 comprise mounts 85 configured for mounting the rotor 94 of the brake assembly 90 thereto. More particularly, the rotor 94 has a plurality of openings matching a pattern of the mounts 85 and a fastener engages each such opening of the rotor 94 and is secured to a respective one of the mounts 85.

Figure 11:
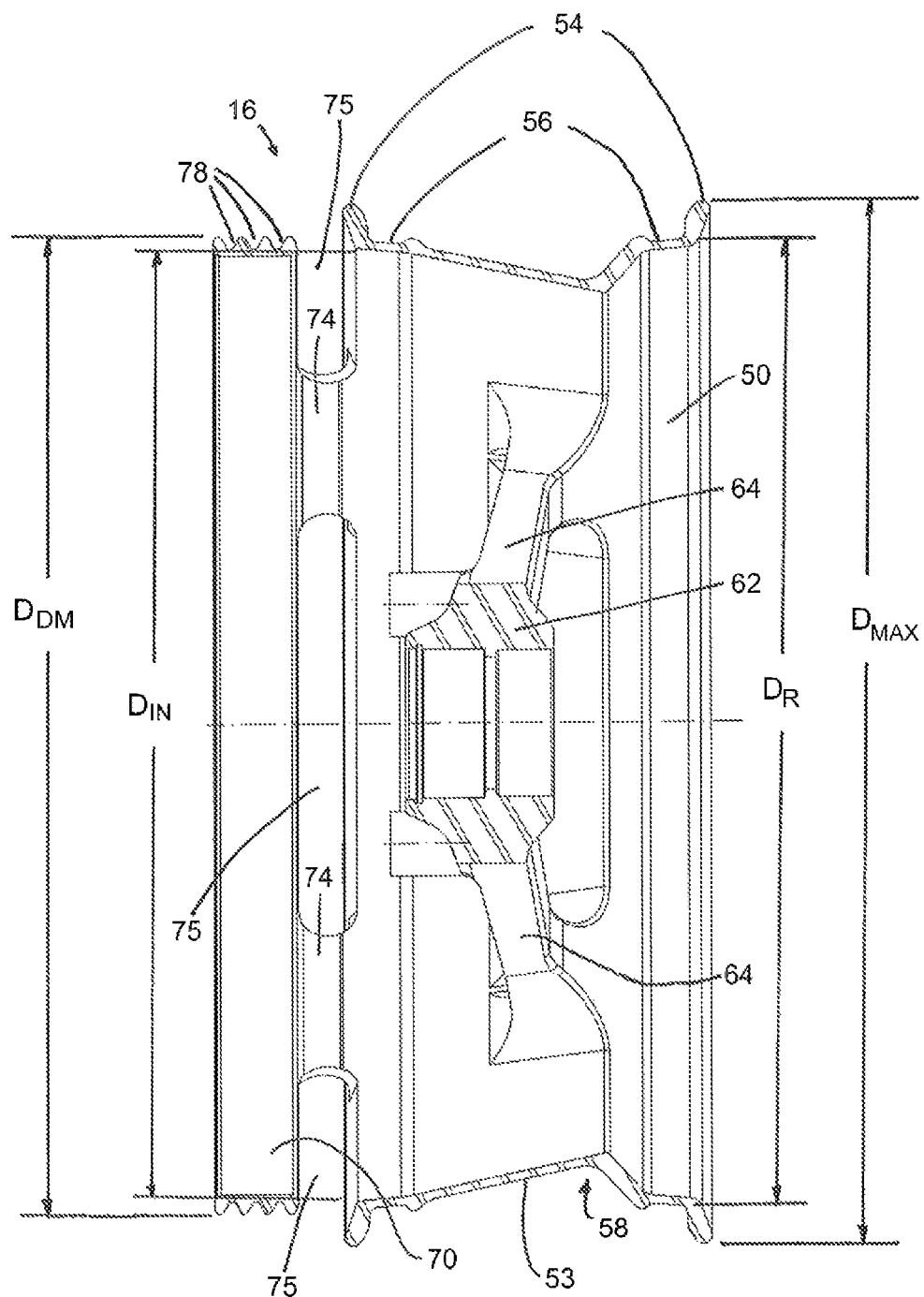
FIG. 11 is a cross-sectional view of the rear wheel of FIG. 8 taken through line 11-11 of FIG. 9.

The rear wheel 16 also comprises an integrated rotary drive member 70 configured to be driven by the motor 152 by a flexible drive element 72 of the transmission assembly 154. The rotary drive member 70 and the rim 50 are concentric. With reference to FIG. 11, the rotary drive member 70 is axially offset from the rim 50 (i.e., spaced apart from the rim 50 in the direction of the wheel rotation axis 39) and has an outer diameter $D_{DM}$ that is significant. For instance, in some cases, a ratio $D_{DM}/D_{MAX}$ of the outer diameter $D_{DM}$ of the rotary drive member 70 over the maximum diameter $D_{MAX}$ of the wheel 16 is at least 0.7, in some cases at least 0.8, in some cases at least 0.9 and in some cases even more. As another example, in some cases, a ratio $D_{DM}/D_R$ of the outer diameter $D_{DM}$ of the rotary drive member 70 over the nominal diameter $D_R$ of the rim 50 may be at least 0.8, in some cases at least 0.9, in some cases at least 1, and in some cases even more. In this implementation, the outer diameter $D_{DM}$ of the rotary drive member 70 is greater than the nominal diameter $D_R$ of the rim 50 (i.e., the ratio $D_{DM}/D_R$ is greater than 1). Moreover, in this implementation, the outer diameter $D_{DM}$ of the rotary drive member 70 is greater than an inner diameter of the rim 50. More specifically, the outer diameter $D_{DM}$ of the rotary drive member 70 is greater than an inner diameter $D_{IN}$ of the rim 50 measured at a left lateral edge of the rim 50 (which is axially between an axial center of the wheel 16 and the rotary drive member 70).

Figure 10:
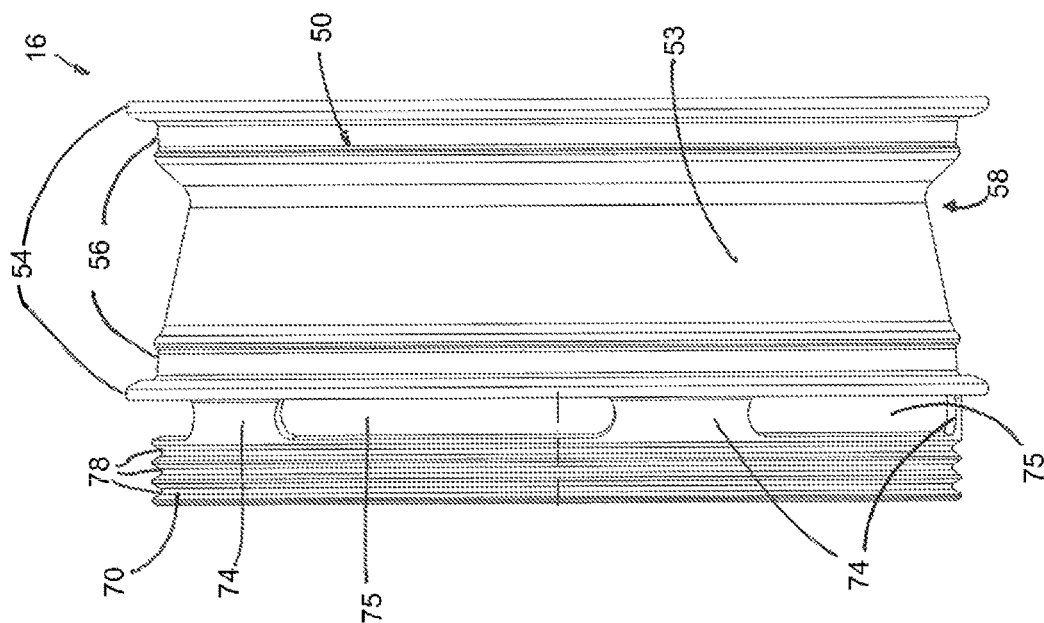
FIG. 10 is a rear elevation view of the rear wheel of FIG. 8.

The rotary drive member 70 is made integrally with the rim 50. That is, the rim 50 and the rotary drive member 70 are formed together during a common manufacturing process such that a material of the rim 50 is continuous with a material of the rotary drive member 70. In this example, the rim 50 and the rotary drive member 70 are cast together and are integrally connected by a plurality of branches 74, as best shown in FIGS. 8 and 10. The branches 74 are spaced apart from one another in a circumferential direction of the wheel 16 by voids 75. The voids 75 allow reduction of a weight of the wheel 16 compared to if the voids 75 were not present. Nevertheless, it is contemplated that, in alternative implementations, the voids 75 may not be present and a continuous ring may connect the rim 50 to the rotary drive member 70. As can be seen, in the present implementation, the rotary drive member 70 is integrally connected to the left lateral edge of the sleeve 53. It is contemplated that the rotary drive member 70 could be integrally connected to other parts of the rim 50. The integral construction of the rotary drive member 70 and the rim 50 may reduce an associated manufacturing cost of the rear wheel 16.

In this implementation, the rotary drive member 70 is a pulley and the flexible drive element 72 is a belt. As best shown in FIGS. 10 and 11, in this example, the pulley 70 comprises a plurality of V-shaped grooves 78 configured for receiving the belt 72. The belt 72 is a multi-groove V-belt having a plurality of formations that are complementary to the grooves 78. In this specific implementation, the plurality of grooves 78 includes three grooves. The pulley 70 may comprise more or less grooves in other implementations.

It is contemplated that the rotary drive member 70 could be any other suitable type of rotary drive member in other implementations. For example, the rotary drive member 70 could be a sprocket integrally connected to the rim 50 and the flexible drive element 72 could be a chain.

The manner in which the rear wheel 16 is driven by the motor 152 will now be described with particular reference to FIGS. 3 to 7.

Figure 7:
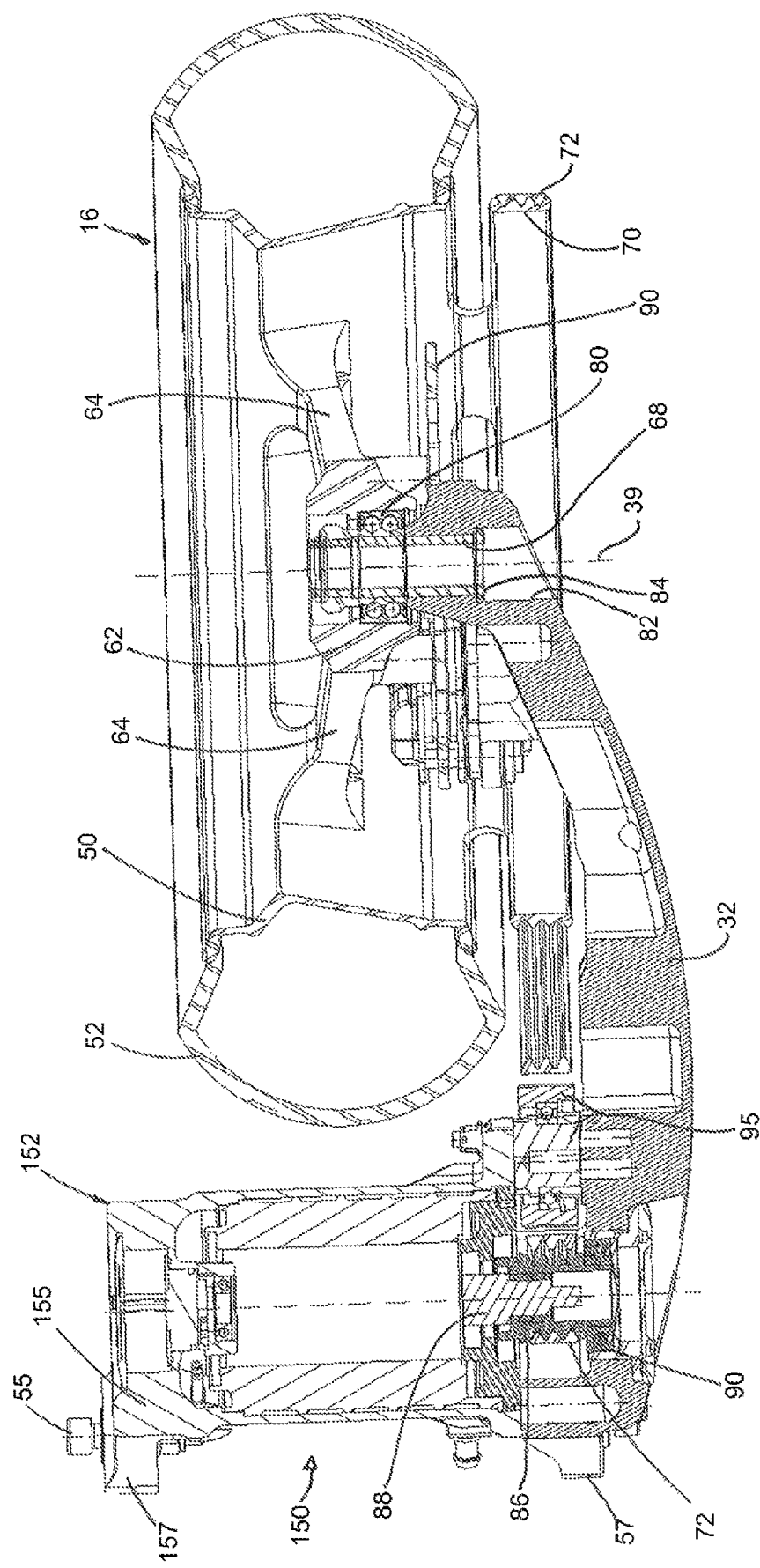
FIG. 7 is a cross-sectional view of the components of FIG. 3 taken through line 7-7 of FIG. 4.

As mentioned above, the rim 50 is rotationally connected to the swing arm 32 and the rotary drive member 70 of the rear wheel 16 is driven by the motor 152 via the belt 72 of the transmission assembly 154. As can be seen in FIG. 7, the rear portion of the swing arm 32 extends inside the rotary drive member 70. As can also be seen in FIG. 7, the belt 72 interconnects the rotary drive member 70 of the rear wheel 16 to an output shaft 88 of the motor 152 via a driving member 86 of the transmission assembly 154. The driving member 86 is compatible with the rotary drive member 70 of the rear wheel 16 and therefore, in this implementation, the driving member 86 is a pulley. As shown in FIG. 7, the driving member 86 is connected to the output shaft 88 of the motor 152 to be rotatable with the output shaft 88 via a key that engages a keyway of the output shaft 88 and a keyway of the driving member 86 receiving the key. The driving member 86 may be rotatably connected to the output shaft 88 in any other suitable way in other implementations. The driving member 86 is also connected to the swing arm 32 via a bearing 90 to be rotatable relative to the swing arm 32.

The driving member 86 is significantly smaller than the rotary drive member 70. For instance, an outer diameter of the driving member 86 is considerably smaller than the outer diameter $D_{DM}$ of the rotary drive member 70. For example, in some cases, a ratio of the outer diameter $D_{DM}$ of the of the rotary drive member 70 over the outer diameter of the driving member 86 may be at least 6, in some cases at least 7, in some cases at least 8, and in some cases even more. There is thus a high reduction ratio between the driving member 86 and the rotary drive member 70 as the driving member 86 rotates considerably faster than the rotary drive member 70 when the output shaft 88 of the motor 152 rotates. This may be useful to reduce the rotational speed transmitted from the output shaft 88 to the rotary drive member 70 since the motor 152 is an electric motor and may therefore have a considerable rotational speed.

With continued reference to FIGS. 4 and 7, the transmission assembly 154 also comprises a tensioning member 95 rotatably mounted to the swing arm 32 and configured to modify a tension of the belt 72. In particular, the tensioning member 95 is positioned such as to increase an angle of wrap of the belt 72 on each of the rotary drive member 70 and the driving member 86 to modify the tension of the belt 72. In this example, the tensioning member 95 is a pulley that engages a flat side of the belt 72 (i.e., opposite a side of the belt 72 shaped to engage the grooves 78 of the pulley 70).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A wheel for a vehicle, comprising:
   a rim configured for mounting a tire, the rim comprising a sleeve;
   a hub:
   a plurality of spokes connecting the hub to the sleeve; and
   a rotary drive member integrally connected to the rim and configured to be operatively connected to a motor of the vehicle.

2. The wheel of claim 1, wherein the rotary drive member is axially offset from the rim.

3. The wheel of claim 1, wherein:
   the rotary drive member has an outer diameter that is greater than an inner diameter of the sleeve.

4. The wheel of claim 3, wherein the outer diameter of the rotary drive member is greater than the inner diameter of the sleeve measured at a lateral edge of the sleeve, the lateral edge of the sleeve being axially between an axial center of the wheel and the rotary drive member.

5. The wheel of claim 1, wherein:
   the rotary drive member has an outer diameter;
   the wheel has a maximum diameter defined by the rim; and
   a ratio of the outer diameter of the rotary drive member over the maximum diameter of the wheel is at least 0.7.

6. The wheel of claim 5, wherein the ratio of the outer diameter of the rotary drive member over the maximum diameter of the wheel is at least 0.9.

7. The wheel of claim 1, wherein the rotary drive member is a pulley.

8. The wheel of claim 1, further comprising a plurality of branches integrally connecting the rotary drive member to the rim, the plurality of branches being circumferentially spaced apart from one another.

9. The wheel of claim 1, wherein the rim and the rotary drive member are concentric.

10. The wheel of claim 1, wherein:
    the rotary drive member is integrally connected to the sleeve.

11. A wheel assembly comprising:
    the wheel of claim 1; and
    a tire mounted to the rim of the wheel.

12. A vehicle comprising:
    a frame;
    a suspension assembly operatively connected to the frame;
    a motor supported by the frame; and
    the wheel assembly of claim 11 rotatably connected to the suspension assembly, the rotary drive member being operatively connected to the motor.

13. The vehicle of claim 12, wherein:
the suspension assembly comprises:
  a swing arm having a proximal end and a distal end, the proximal end of the swing arm being pivotally connected to the frame about a swing arm pivot axis; and
  a shock absorber connected between the swing arm and the frame; and
the wheel is rotatably connected to the distal end of the swing arm.

14. The vehicle of claim 13, wherein the motor is mounted to the swing arm and is pivotable about the swing arm pivot axis.

15. The vehicle of claim 13, wherein the swing arm extends at least in part inside the rotary drive member.

16. The vehicle of claim 12, wherein the motor is an electric motor.

17. The vehicle of claim 12, wherein:
the motor comprises an output shaft; and
the vehicle comprises a transmission assembly operatively connecting the output shaft to the rotary drive member of the wheel, the transmission assembly comprising:
  a driving member connected to the output shaft of the motor; and
  a flexible drive element interconnecting the driving member of the motor to the rotary drive member of the wheel.

18. The vehicle of claim 17, wherein:
the rotary drive member of the wheel has an outer diameter;
the driving member of the transmission assembly has an outer diameter; and
a ratio of the outer diameter of the rotary drive member of the wheel over the outer diameter of the driving member of the transmission assembly is at least 8.

19. The vehicle of claim 12, wherein the suspension assembly is a rear suspension assembly.

20. A wheel for a vehicle, comprising:
a rim configured for mounting a tire, the rim comprising a sleeve; and
a rotary drive member integrally connected to the rim and configured to be operatively connected to a motor of the vehicle, the rotary drive member having an outer diameter that is greater than an inner diameter of the sleeve.

21. A wheel for a vehicle, comprising:
a rim configured for mounting a tire;
a rotary drive member integrally connected to the rim and configured to be operatively connected to a motor of the vehicle; and
a plurality of branches integrally connecting the rotary drive member to the rim, the plurality of branches being circumferentially spaced apart from one another.

* * * * *